US006892650B2

(12) United States Patent
Baloga et al.

(10) Patent No.: US 6,892,650 B2
(45) Date of Patent: May 17, 2005

(54) MOVABLE DISPLAY SUPPORT SYSTEM

(75) Inventors: Mark A. Baloga, East Grand Rapids, MI (US); Carl V. Forslund, III, East Grand Rapids, MI (US); Thomas G. Feldpausch, Hastings, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 09/887,519

(22) Filed: Jun. 22, 2001

(65) Prior Publication Data

US 2002/0194791 A1 Dec. 26, 2002

(51) Int. Cl.$^7$ ................................................ A47B 37/00
(52) U.S. Cl. .................................... 108/50.01; 108/152
(58) Field of Search ............................... 312/196, 223.3, 312/280; 108/143, 50.02, 103, 50.11, 50.01, 152, 108, 50; 248/285.1, 286.1

(56) References Cited

U.S. PATENT DOCUMENTS

| 119,054 | A | 9/1871 | Shryock |
| 241,600 | A | 5/1881 | Bray |
| 241,925 | A | 5/1881 | Cadwell |
| 249,198 | A | 11/1881 | Moon |
| 253,538 | A | 2/1882 | McLane |
| 454,844 | A | 6/1891 | Brewerton et al. |
| 475,126 | A | 5/1892 | Lorenz |
| 549,347 | A | 11/1895 | Clark |

(Continued)

FOREIGN PATENT DOCUMENTS

| AT | 164466 | 11/1949 |
| DE | 232680 | 3/1964 |
| DE | 1 561 580 | 4/1970 |
| DE | 3132015 | * 10/1982 |
| GB | 124334 | 3/1919 |
| GB | 2127682 | * 4/1984 |
| JP | 3-93944 | 4/1991 |
| JP | 3-93946 | 4/1991 |

OTHER PUBLICATIONS

U.S. Appl. No. 10/026,964, filed Dec. 21, 2001, (102 total pgs. with FIGURES 1–67 (50 drawing sheets).
M.A. Baloga, C.V. Forslund III, et al., Compilation titled "Bluespace" dated Aug. 29, 2000 (internal document proprietary to Steelcase Inc.).
Brochure by UNIFOR titled "Panelli PL" (undated) (37 sheets).
Brochure by UNIFOR titled "Progetto 25.90" (undated) (19 sheets).
Promotional material (chart) by Dowing Displays of Milford, Ohio, showing models (no date), (8 color sheets).
Promotional material for "The Office of the Future", by Tarrant Interiors—of Fort Worth, Texas, (no date), (4 sheets).

(Continued)

*Primary Examiner*—Jose V. Chen
(74) *Attorney, Agent, or Firm*—Foley & Lardner LLP (57) ABSTRACT

A movable support system for at least one display device is disclosed having a track system and a base movably mounted at a first section to the track system. A display support assembly adapted for coupling of the display device is pivotally mounted at a second section of the base. The display device installed on the display support assembly may be selectively positioned for use in a variety of locations relative to the track system. An apparatus is also disclosed providing a movable support for a display device, including a track system providing at least one track and a support movably coupled at a first section to the track system. The apparatus also includes a display support movably coupled to a second section of the support and configured for coupling at least two display panels. Each of the display panels may be positioned for use in a variety of locations relative to the track.

61 Claims, 5 Drawing Sheets

U.S. PATENT DOCUMENTS

| | | | |
|---|---|---|---|
| 605,148 A | 6/1898 | Sylvester | |
| 621,835 A | 3/1899 | MacDonald | |
| 627,396 A | 6/1899 | Daly | |
| 713,417 A | 11/1902 | Feldmann, Jr. et al. | |
| 821,144 A | 5/1906 | Walsh | |
| 943,821 A | 12/1909 | Feldmann, Jr. | |
| 950,006 A | 2/1910 | McCarty | |
| 955,586 A | 4/1910 | Emerich | |
| 997,866 A | 7/1911 | Smith | |
| 1,086,236 A | 2/1914 | Staples | |
| 1,116,484 A | 11/1914 | Ralph | |
| 1,122,926 A | 12/1914 | Hick | |
| 1,141,404 A | 6/1915 | Moseley | |
| 1,203,659 A | 11/1916 | Smith | |
| 1,254,036 A | 1/1918 | Grant | |
| 1,326,832 A | 12/1919 | Baily | |
| 1,457,990 A | 6/1923 | Morgan | |
| 1,599,888 A | 9/1926 | Haskell | |
| 1,616,897 A | 2/1927 | Hayes | |
| 1,688,456 A | 10/1928 | Dolph | |
| 1,770,755 A | 7/1930 | Kleinpell | |
| 1,826,469 A | 10/1931 | Hunt et al. | |
| 1,881,636 A | 10/1932 | Johnson et al. | |
| 1,887,539 A | 11/1932 | Brown | |
| 1,943,629 A | 1/1934 | Schwartz | |
| 1,958,579 A | 5/1934 | Johnson et al. | |
| 2,070,408 A | 2/1937 | Leidgen | |
| 2,144,083 A | 1/1939 | Rentfrow, Sr. | |
| 2,182,703 A * | 12/1939 | Rainwater | 108/92 |
| 2,348,414 A | 5/1944 | Pierce | |
| 2,583,803 A | 1/1952 | Amer | |
| 2,691,238 A | 10/1954 | Svatos | |
| 2,713,609 A | 7/1955 | Niklason | |
| 2,778,512 A | 1/1957 | Strona | |
| 2,812,067 A | 11/1957 | Gussack | |
| 2,870,459 A | 1/1959 | Zabielski | |
| 2,886,182 A | 5/1959 | Dauman | |
| 2,928,555 A | 3/1960 | Childs et al. | |
| 2,963,332 A | 12/1960 | Breuning | |
| 2,979,155 A | 4/1961 | Scharfenberger | |
| 3,017,999 A | 1/1962 | Cano | |
| 3,042,978 A | 7/1962 | Eames et al. | |
| 3,060,521 A | 10/1962 | Greco | |
| 3,078,133 A | 2/1963 | Schauer | |
| 3,141,207 A | 7/1964 | Kahler | |
| 3,181,274 A | 5/1965 | Izenour | |
| 3,251,477 A | 5/1966 | Parstorfer | |
| 3,286,382 A | 11/1966 | Newman | |
| 3,351,211 A | 11/1967 | Best | |
| 3,391,796 A | 7/1968 | Cross | |
| 3,412,868 A | 11/1968 | Carter | |
| 3,425,568 A | 2/1969 | Albright | |
| 3,514,883 A | 6/1970 | Albright | |
| 3,557,499 A | 1/1971 | Dickie et al. | |
| 3,683,100 A | 8/1972 | Deal et al. | |
| 3,732,633 A | 5/1973 | Margolis et al. | |
| 3,760,952 A | 9/1973 | White | |
| 3,777,896 A | 12/1973 | Ehrlich | |
| 3,797,146 A | 3/1974 | Holes | |
| 3,883,972 A | 5/1975 | Propst et al. | |
| 3,921,320 A | 11/1975 | McWilliams | |
| 3,924,749 A | 12/1975 | Weston | |
| 3,955,788 A | 5/1976 | Delage | |
| 3,975,837 A | 8/1976 | Baars | |
| 3,984,930 A | 10/1976 | Booland | |
| 4,033,058 A | 7/1977 | Lyman | |
| 4,135,775 A | 1/1979 | Driscoll | |
| 4,166,332 A | 9/1979 | Donovan | |
| 4,180,298 A | 12/1979 | Borgerson, Jr. | |
| 4,194,313 A | 3/1980 | Downing | |
| 4,239,170 A | 12/1980 | Planebo | |
| 4,270,290 A | 6/1981 | Eckert | |
| 4,323,291 A * | 4/1982 | Ball | 108/150 |
| 4,360,240 A | 11/1982 | Koncelik et al. | |
| 4,360,991 A | 11/1982 | West | |
| 4,428,136 A | 1/1984 | Franklin | |
| 4,447,973 A | 5/1984 | Wihlke | |
| 4,457,436 A | 7/1984 | Kelley | |
| 4,478,467 A | 10/1984 | Tyndall | |
| 4,561,619 A * | 12/1985 | Robillard et al. | 108/143 |
| 4,569,448 A | 2/1986 | Graham | |
| 4,588,190 A | 5/1986 | Stewart et al. | |
| 4,606,394 A | 8/1986 | Bannister | |
| 4,620,635 A | 11/1986 | Morand | |
| 4,632,417 A | 12/1986 | Hodapp | |
| 4,635,417 A | 1/1987 | Larouche | |
| 4,637,666 A * | 1/1987 | Worrell et al. | 108/143 |
| 4,658,966 A | 4/1987 | Broek | |
| 4,659,048 A * | 4/1987 | Fahrion | 108/102 |
| 4,715,154 A | 12/1987 | Baloga | |
| 4,716,698 A | 1/1988 | Wilson et al. | |
| 4,723,665 A | 2/1988 | Benedict et al. | |
| 4,723,821 A | 2/1988 | Montgomery | |
| 4,732,089 A * | 3/1988 | Mueller | 108/102 |
| 4,750,305 A | 6/1988 | Bastian | |
| 4,793,495 A | 12/1988 | Preu | |
| 4,805,331 A | 2/1989 | Boggess et al. | |
| 4,852,500 A * | 8/1989 | Ryburg et al. | 108/105 |
| 4,902,229 A | 2/1990 | Pedersen et al. | |
| 4,913,297 A | 4/1990 | Wells | |
| 4,928,465 A | 5/1990 | Del Castillo Von Haucke | |
| 4,932,172 A | 6/1990 | Maas | |
| 4,979,785 A | 12/1990 | Richards | |
| 4,986,194 A | 1/1991 | Bollman | |
| 5,025,603 A | 6/1991 | Johnson | |
| 5,090,171 A | 2/1992 | Kano et al. | |
| 5,108,063 A | 4/1992 | Koerber, Sr. et al. | |
| 5,109,994 A | 5/1992 | Kidd et al. | |
| 5,112,020 A | 5/1992 | Ginsberg | |
| 5,125,202 A | 6/1992 | Kissinger | |
| 5,139,155 A | 8/1992 | Laxson | |
| 5,160,050 A | 11/1992 | Russo | |
| 5,161,321 A | 11/1992 | Kuhnke | |
| 5,181,334 A | 1/1993 | Mima | |
| 5,214,885 A | 6/1993 | Maas et al. | |
| 5,226,548 A | 7/1993 | Koeppel | |
| 5,241,796 A | 9/1993 | Hellwig et al. | |
| 5,277,007 A | 1/1994 | Hellwig et al. | |
| 5,282,341 A * | 2/1994 | Baloga et al. | 49/41 |
| 5,289,926 A | 3/1994 | Lewis et al. | |
| 5,290,002 A | 3/1994 | Cohen | |
| 5,301,477 A | 4/1994 | Rellinger et al. | |
| 5,309,686 A | 5/1994 | Underwood et al. | |
| 5,321,579 A * | 6/1994 | Brown et al. | 174/48 |
| 5,375,802 A | 12/1994 | Branham, II | |
| 5,379,977 A | 1/1995 | Rönn et al. | |
| 5,384,999 A | 1/1995 | Roche et al. | |
| 5,392,934 A | 2/1995 | Fox | |
| 5,394,631 A | 3/1995 | Bosio | |
| 5,405,117 A | 4/1995 | Davis | |
| 5,406,761 A | 4/1995 | Hobbiebrunken et al. | |
| 5,422,155 A | 6/1995 | Spence, Jr. | |
| 5,428,928 A | 7/1995 | Hellwig et al. | |
| 5,486,391 A | 1/1996 | Tyner | |
| 5,495,953 A | 3/1996 | Bearth | |
| 5,503,278 A | 4/1996 | Ishmael | |
| 5,511,348 A | 4/1996 | Cornell et al. | |
| 5,513,574 A | 5/1996 | Collins | |
| 5,534,963 A | 7/1996 | Adolphi et al. | |
| 5,536,080 A | 7/1996 | Madimenos et al. | |

| | | | |
|---|---|---|---|
| 5,537,290 A | | 7/1996 | Brown et al. |
| 5,558,418 A | * | 9/1996 | Lambright et al. ...... 312/321.5 |
| 5,584,546 A | | 12/1996 | Gurin et al. |
| 5,588,659 A | | 12/1996 | Boes et al. |
| 5,590,940 A | | 1/1997 | Richard |
| 5,607,214 A | | 3/1997 | Pierce et al. |
| 5,609,112 A | | 3/1997 | Meyer et al. |
| 5,635,265 A | | 6/1997 | Potokar |
| 5,647,172 A | | 7/1997 | Rokicki |
| 5,649,631 A | | 7/1997 | Loflin |
| 5,651,219 A | | 7/1997 | Baloga et al. |
| 5,655,672 A | | 8/1997 | Stuchlik, III |
| 5,669,518 A | | 9/1997 | Kundel |
| 5,675,946 A | | 10/1997 | Verbeek et al. |
| 5,687,499 A | | 11/1997 | Brnjac |
| 5,687,513 A | | 11/1997 | Baloga et al. |
| 5,694,881 A | | 12/1997 | Creech |
| 5,695,264 A | | 12/1997 | Koch |
| 5,711,121 A | | 1/1998 | Garver |
| D390,967 S | | 2/1998 | Beuster et al. |
| 5,724,778 A | | 3/1998 | Cornell et al. |
| 5,743,193 A | | 4/1998 | Kakuta et al. |
| 5,746,330 A | | 5/1998 | DiBetta |
| 5,765,315 A | | 6/1998 | Nagamitsu et al. |
| 5,826,385 A | | 10/1998 | Dykstra et al. |
| 5,826,639 A | | 10/1998 | Miller |
| 5,829,202 A | | 11/1998 | Canton Gongora et al. |
| 5,831,211 A | | 11/1998 | Gartung et al. |
| 5,848,698 A | | 12/1998 | Stompe |
| 5,873,205 A | | 2/1999 | Hanlon et al. |
| 5,901,513 A | | 5/1999 | Mollenkopf et al. |
| 5,904,328 A | * | 5/1999 | Leveridge et al. ...... 248/124.1 |
| 5,931,429 A | | 8/1999 | Hellwig et al. |
| 5,941,713 A | | 8/1999 | Wayner et al. |
| 5,952,796 A | | 9/1999 | Colgate et al. |
| 5,966,879 A | | 10/1999 | Verbeck et al. |
| 5,984,441 A | | 11/1999 | Stokhuijzen |
| 6,048,044 A | | 4/2000 | Biggel et al. |
| 6,076,317 A | | 6/2000 | Hollwig et al. |
| 6,076,903 A | | 6/2000 | Vander Park |
| 6,099,093 A | * | 8/2000 | Spence ................... 108/50.01 |
| 6,244,991 B1 | | 6/2001 | Bingham |
| 6,249,999 B1 | | 6/2001 | Börge et al. |
| 6,250,019 B1 | | 6/2001 | Simons, Jr. et al. |
| 6,253,509 B1 | | 7/2001 | Hellwig et al. |
| 6,275,375 B1 | * | 8/2001 | Nam ..................... 248/346.06 |
| 6,317,316 B1 | * | 11/2001 | Bentley et al. ............. 248/917 |
| 6,343,006 B1 | * | 1/2002 | Moscovitch et al. ........ 348/794 |
| 6,344,610 B1 | | 2/2002 | Berndt |
| 6,374,547 B1 | | 4/2002 | Baloga et al. |
| 6,374,548 B1 | | 4/2002 | Ruedinger et al. |
| 6,409,134 B1 | * | 6/2002 | Oddsen, Jr. ............. 248/274.1 |
| 6,449,909 B1 | | 9/2002 | Baloga et al. |
| 6,463,701 B1 | | 10/2002 | Baloga et al. |
| 2002/0191400 A1 | | 12/2002 | Jilk et al. |

OTHER PUBLICATIONS

Innamorati, Francesco, "The Telematic Tree", Habitat Ufficio, bearing a designation 1991 (5 sheets).

Advertisement for "Ameriwood Oak Armoire", by Office Max, bearing a designation "Nov. 11, 1995", (1 sheet).

Gertsakis, John, "Durable Yet Future Proof", bearing a designation "© 1996", National Key Centre for Design at RMIT, from Internet site: www.cfd.rmit.edu.au/outcomes/erdnews/ERD6/HOTdesk.html on Oct. 27, 1998 (3 sheets).

Promotional materials for "A World of Possibilities, Introducing Contrada™. The Next Generation in Office Furniture.", by Trendway Corporation of Holland, Michigan, bearing a designation "© 1998" (8 sheets).

Promotional material for "Village Wall," By Tellus Furniture a Paoli Company of Orleans, Indiana, bearing a designation "©1998 Tellus Furniture", (8 color sheets).

Yates, JoAnne, "Graphic ROI Reporting," Knowledge Management at 106, (Oct. 1998) (2 sheets).

Brochure for "TooGo New Workplace Solutions", by Egan Visual, bearing a designation "©Copyright Egan Visual 1999", (16 color sheets).

Catalog pages for "Details" a Steelcase Company, with a 3/01 indication, "© 2001 Office Details Inc." (6 color sheets).

U.S. Appl. No. 09/182,998, titled "Information Display System" as filed on Oct. 30, 1998, including specification, claims, drawings and abstract (104 sheets).

U.S. Appl. No. 09/183,023, titled "Workstation" as filed Oct. 30, 1998, including specification, claims, drawings and abstract (106 sheets).

U.S. Appl. No. 09/645,023, titled "WORKSTATION" as filed Aug. 23, 2000, including specification, claims, drawings and abstract (106 sheets). Preliminary Amendment filed Aug. 23, 2000 (40 sheets).

U.S. Appl. No. 09/669,913, titled "Display Board System" as filed Sep. 25, 2000, including specification, claims, drawings and abstract (66 sheets). Preliminary Amendment filed Sep. 25, 2000 (36 sheets).

U.S. Patent Application titled Workstation, U.S. Appl. No. 09/183,023 filed Oct. 30, 1998; 106 pages, Figures 1–33 listing inventors Mark A. Baloga and Carl V. Forslund III.

U.S. Patent Application titled Movable Office Support System, U.S. Appl. No. 09/888,069, filed Jun. 22, 2001; 28 pages, Figures 1–10 listing inventors Thomas G. Feldpausch, Carl V. Forslund III and Mark A. Baloga.

M.A. Baloga, C.V. Forslund III, et al., Compilation titled "Bluespace" dated Aug. 29, 2000 (internal document proprietary to Steelcase Inc.).

Progetto 25.90, cover and inside page of brochure along with pp. 12–13, bearing a date designation of 1991.

* cited by examiner

MOVABLE DISPLAY SUPPORT SYSTEM

CROSS-REFERENCE TO RELATED APPLICATIONS

The following patents and/or patent applications are hereby incorporated by reference: U.S. patent application Ser. No. 09/888,069 titled "Movable Office Support System" filed Jun. 22, 2001 U.S. patent application Ser. No. 09/183, 023 titled "Workstation" filed Oct. 30, 1998 now U.S. Pat. No. 6,374,547, now U.S. Pat. No. 6,375,547.

FIELD OF THE INVENTION

The present invention relates to a movable display support system. The present invention also relates to a support system for a display device or the like which is movable within a work space to support one or more workers in a wide variety of use conditions.

BACKGROUND

It is known to provide for a display device such as a display panel, video monitor (e.g. CRT), television screen or other video display to present information (in some form) for entertainment or use by one or more workers in an office or other work environment. Display devices are generally associated with electronic equipment or appliances, such as computing devices or video receivers (e.g. television or the like).

In a typical application, the display device is positioned on a fixed worksurface (such as a table or desk), and thereby is in a relatively fixed or "static" position relative to workers or other persons who enter a work space (such as an office). Where the display device is a conventional video monitor, it may be difficult (if not also inconvenient) to adapt the position of the display device to the needs of one or more workers who may have the need or desire to view or share information presented. Likewise, it can be difficult to move the display device to a less prominent position within the work space, for example when information is to be viewed in private, or when the display device is not in use. In any event, according to known arrangements, it is typically difficult as well as inconvenient to move a display device from an in-use position where information can be viewed and shared readily to a private or stowed position where information is not displayed or not to be shared by persons in the work space. As a result, in many applications, display devices, once installed in a work space, are not repositioned frequently—even if repositioning would be desirable or advisable under the circumstances.

The more prevalent use of display panels (e.g. flat panel displays) as display devices for computing devices has to some extent lessened the inconvenience of repositioning, but the basic difficulties remain. Moreover, the need to provide a connection for utilities (e.g. power and/or data) to the display device is also a consideration. In typical applications, such connections are made by cables and require suitable proximity to outlets, and cause additional difficulty to be addressed when the display device is to be repositioned within the work space.

Fixture arrangements for display devices, such as adjustable arms, bases or stands, are known. However, such arrangements are typically positioned in a fixed location within the work space and thereby allow for a limited range of motion or change in orientation of the display device. Moreover, it is typical for such arrangements to accommodate only a single display device. When two (or more) display devices are used, the difficulties of positioning and repositioning may be multiplied.

Accordingly, it would be advantageous to provide a support system for a display device that allows for convenient repositioning of the display device within a work space. It would also be advantageous to provide a support system for a display device that provides for a wide range of motion and allows for a variety of orientations of the display device. It would further be advantageous to provide for a support system for a display device that can accommodate one or two or more display devices. It would further be advantageous to provide for a support system that provides for convenient management and interconnection of cables providing utilities to the display device (or display devices). It would further be advantageous to provide for a support system for a display device that can readily be integrated with the articles of furniture within a work space. It would further be advantageous to provide for a support system for a display device that can provide an interface for known fixture arrangements used for display devices.

It would be desirable to provide a system and method having any one or more of these or other advantageous features.

SUMMARY OF THE INVENTION

The present invention relates to a movable support system for at least one display device. The system includes a track system and a base movably mounted at a first section to the track system. The system also includes a display support assembly adapted for coupling of the display device and pivotally mounted at a second section of the base. The display device installed on the display support assembly may be selectively positioned for use in a variety of locations relative to the track system.

The present invention also relates to an apparatus providing a movable support for a display device. The system includes a track system providing at least one track and a support movably coupled at a first section to the track system. The system also includes a display support movably coupled to a second section of the support and configured for coupling of at least two display panels. Each of the display panels may be positioned for use in a variety of locations relative to the track.

The present invention further relates to a movable support system for at least one display device configured to be coupled to utilities such as power or data through cables. The system includes a track and a support movably mounted at a first section to the track. The system also includes a display support adapted for coupling of a display device and pivotally mounted at a second section of the support. The display device installed on the display support may be selectively positioned for use in a variety of locations relative to the track, wherein the support is configured to provide at least one passage for management of cables configured to be coupled to the display device.

The present invention also relates to a movable support system for use by at least one person in a work space having an entrance. The system includes a track system and a base movably mounted at a first section to the track system. The system also includes a display support assembly adapted for coupling of at least one display device and pivotally mounted at a second section of the base. A display device installed on the display support assembly may be selectively positioned for use in a variety of locations relative to the track system so that each person within the work space may selectively choose a body orientation or a body position relative to the entrance or otherwise within the workspace while using the display device.

DETAILED DESCRIPTION OF EXEMPLARY EMBODIMENTS

Figure 1:
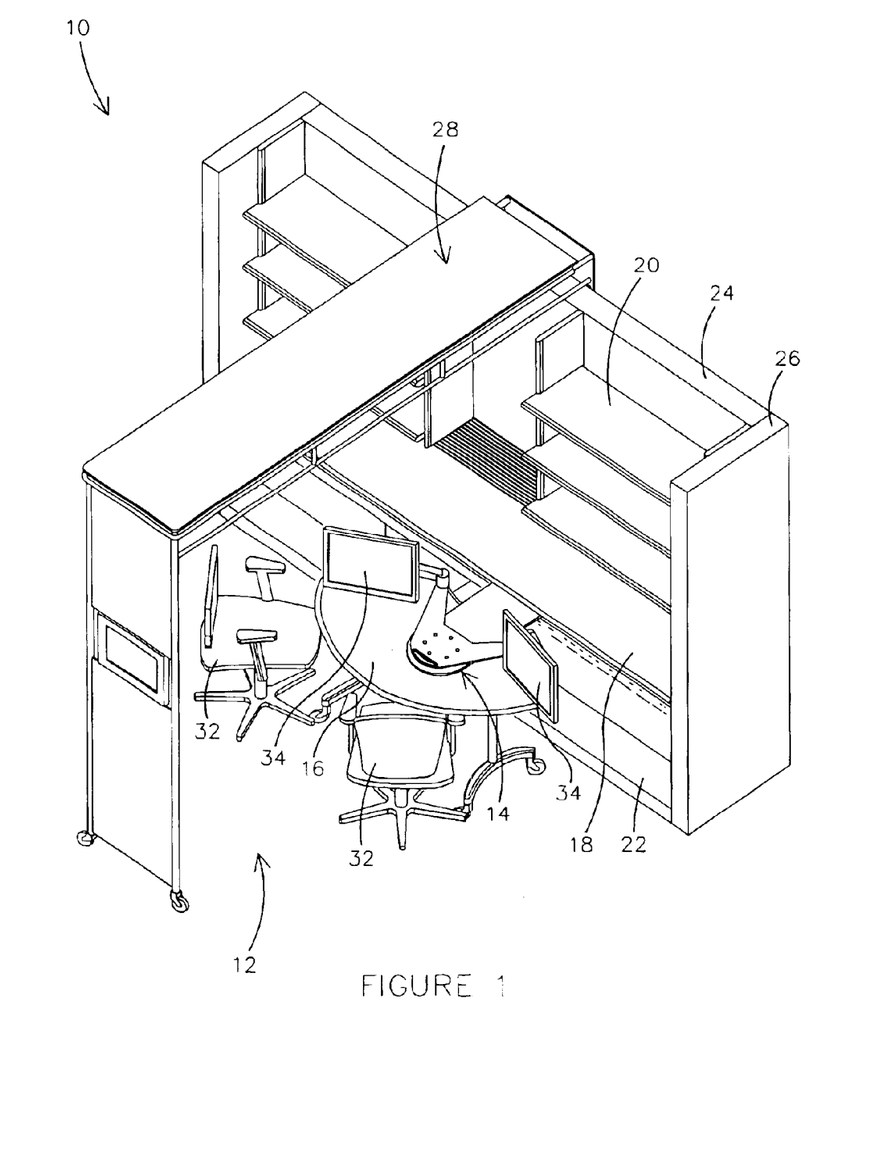
FIG. 1 is a perspective view of work space providing a display support system according to an exemplary embodiment.

Referring to FIG. 1, a work space 10 is shown including a workstation 12 configurable for use by one or a plurality of workers or other persons. Workstation 12 includes a movable display support system 14 along with other articles of furniture shown as an associated mobile worksurface or table 16, a fixed worksurface 18, storage units shown as shelving units 20 and lateral files 22. Work space 10 also provides walls shown as partial height partition walls including a base wall 24 and side walls 26 as well as a utility threshold 28 movable on a track 30 (not visible in FIG. 1). According to any preferred embodiment, the utility threshold is of a type disclosed in U.S. patent application Ser. No. 09/183,023, titled "Workstation" and filed on Oct. 30, 1998, and in U.S. patent application Ser. No. 09/183,021, titled "Work Environment" and also filed on Oct. 30, 1998 (both incorporated by reference herein), providing functionality and features such as power, voice and data connections, display devices or information display panels, lighting, privacy screens, etc. Also shown in work space 10 are chairs 32 (which can be of any conventional type, preferably mobile chairs). As shown, movable display support system 14 includes two display devices shown as display panels 34.

Figure 2:
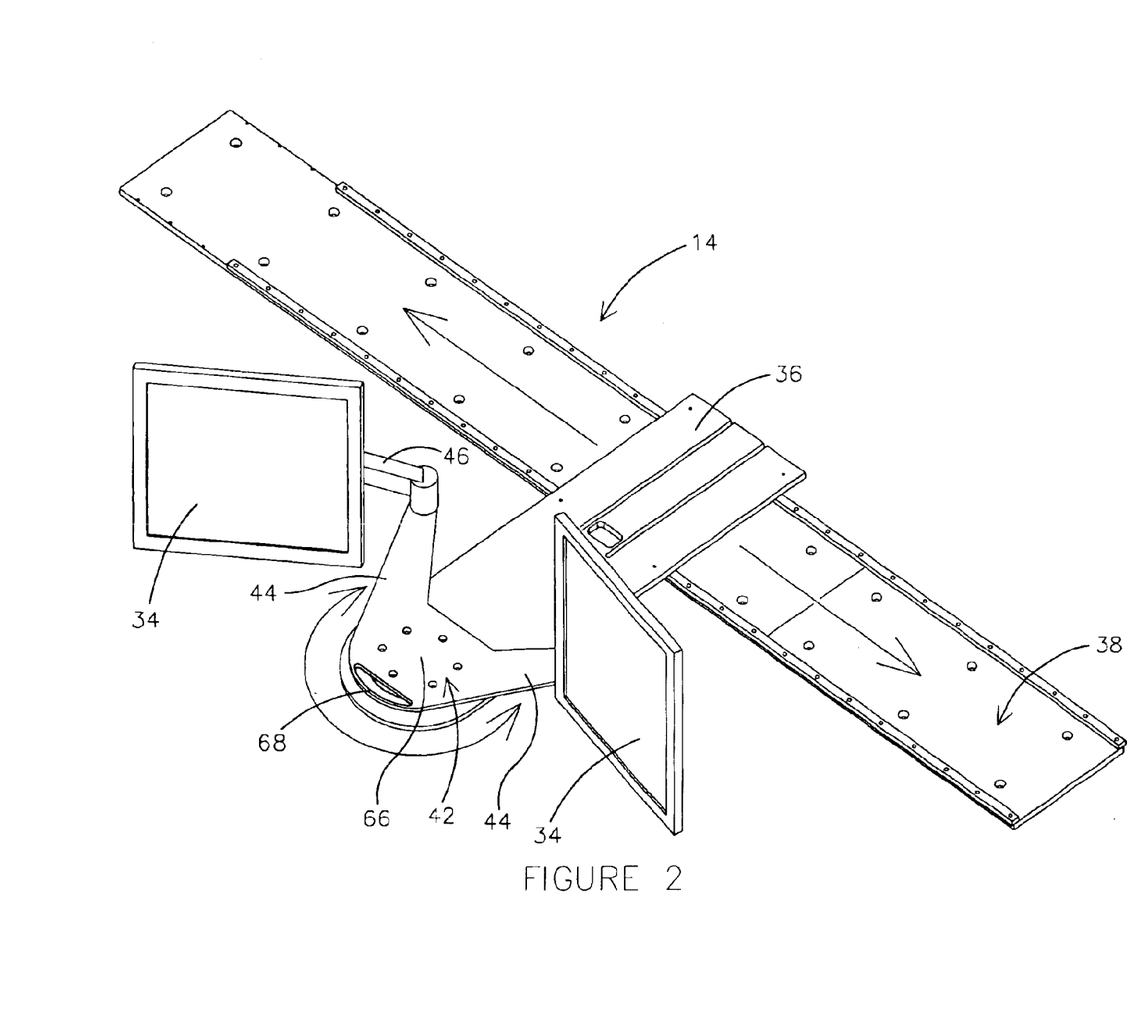
FIG. 2 is a front perspective view of the display support system according to an exemplary embodiment
Figures 3A, 3B:
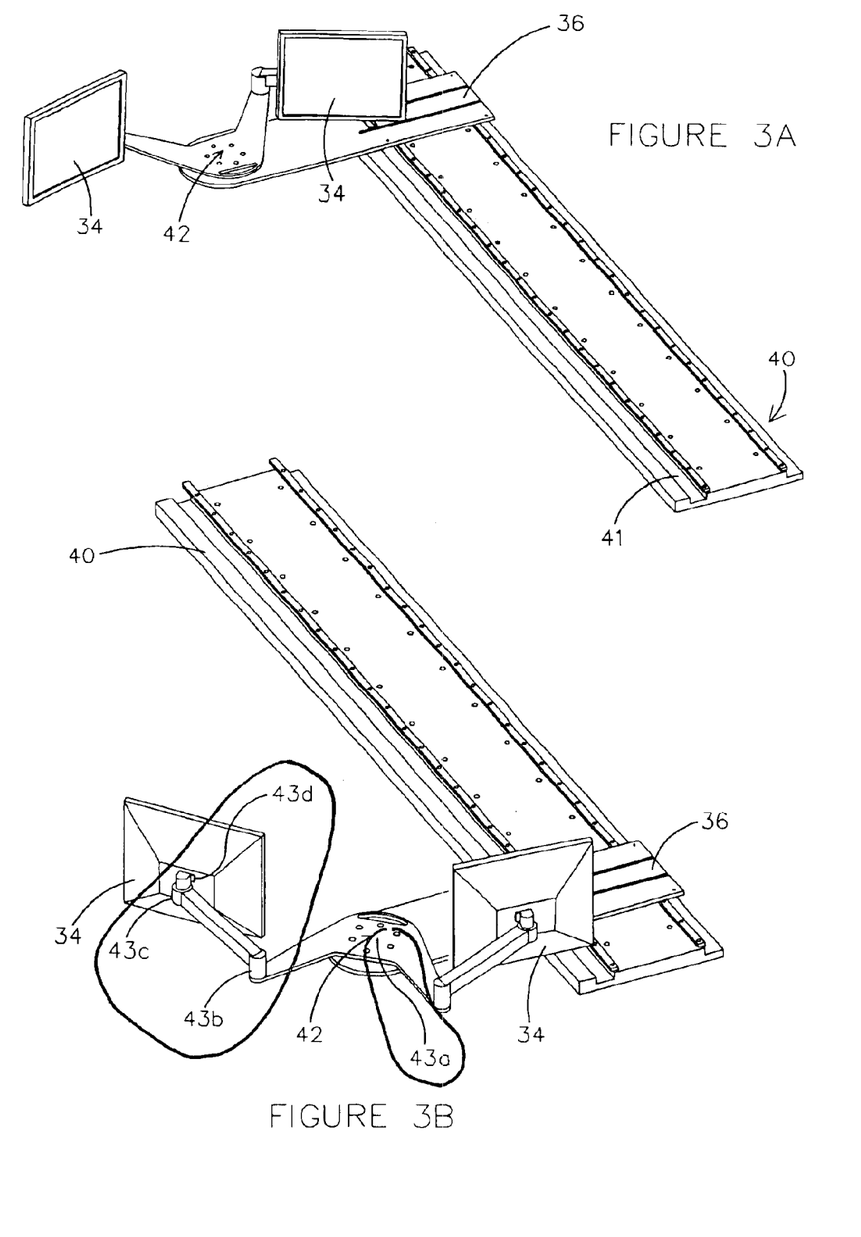
FIGS. 3A and 3B are top perspective views of the support system.

Referring to FIG. 2, movable display support system 14 is shown. Support system 14 includes a base 36 mounted to a track system 38 for translating movement (e.g. linear or curved or other) along a path of travel. Track system 38 is installed upon a mounting structure shown as a panel 40 (shown in FIG. 3). A passage in panel 40 shown as groove 41 can be used for routing various cables to base 36. Support system 14 also includes a display support assembly 42 movably coupled to the base 36. Support assembly 42 includes flanges 44 configured for attachment of a fixture or structure shown as an articulable arm 46 used to support an information display device shown as a display panel 34 (or any other structure such as a base or fixture of any conventional type providing one or more points or "joints" for movement of a mounted display device). According to an exemplary embodiment, support assembly 42 is pivotably coupled to base 36 and each articulable arm 46 is movably coupled to flange 44 to allow suitably positioning and/or orientation of display panel 34 in any of a variety of directions (e.g., up, down, laterally, pivotably) at each point or joint allowing articulation (e.g. translation, extension, retraction, rotation, etc.). As shown in FIGS. 3A and 3B, the selective movement of base 36 with respect to the mounting structure shown as panel 40 (e.g. along track system 38) and/or of support assembly 42 with respect to base 36 provides for the positioning and orientation of one or more of display panels 34 within a substantial range of motion in work space 10; selective movement of display panel 34 with respect to support assembly 42 provides for additional range of motion within work space 10.

Figures 4A, 4B:
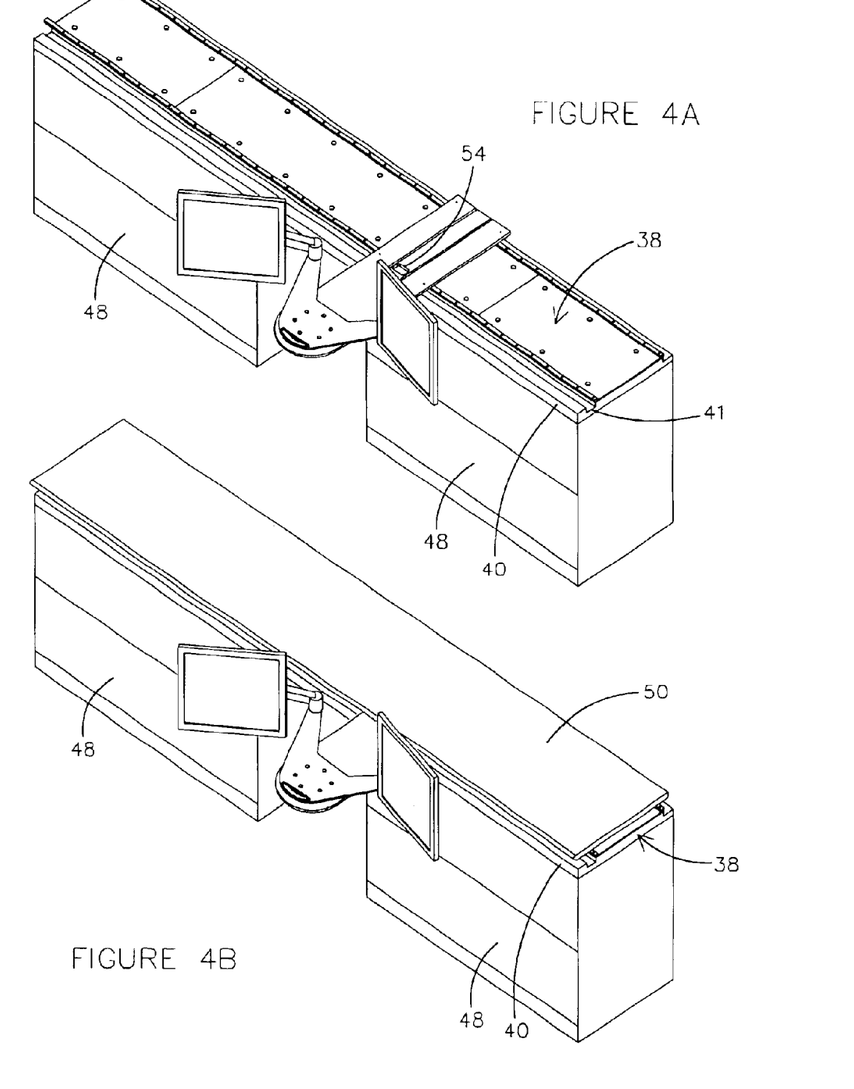
FIGS. 4A and 4B are top perspective views of the display support system within in a work station providing an article of furniture according to an exemplary embodiment.

According to an exemplary embodiment shown in FIGS. 4A and 4B, panel 40 for track system 38 is installed horizontally between two storage units 48; a worksurface 50 may be installed within work space 10 over track system 38. According to any preferred embodiment, the system may be integrated with or within articles of furniture in the work space.

Figure 5:
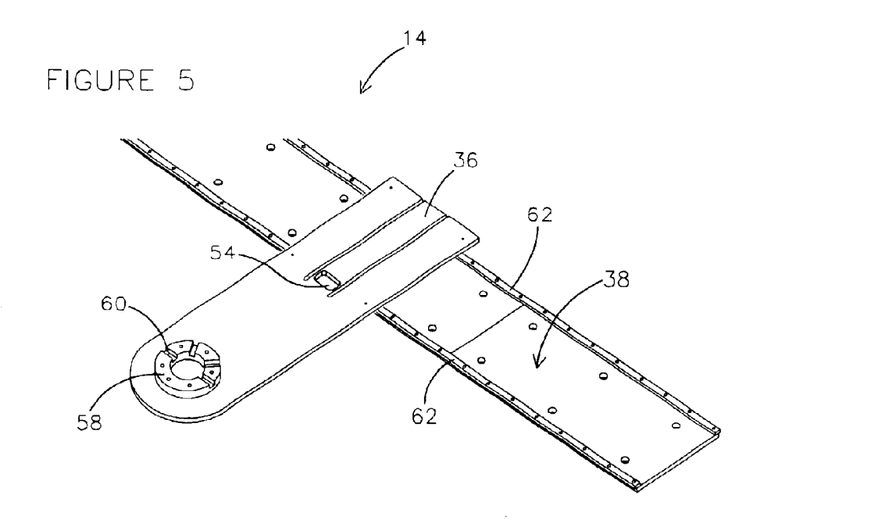
FIG. 5 is a top perspective view of the support system.
Figure 6:
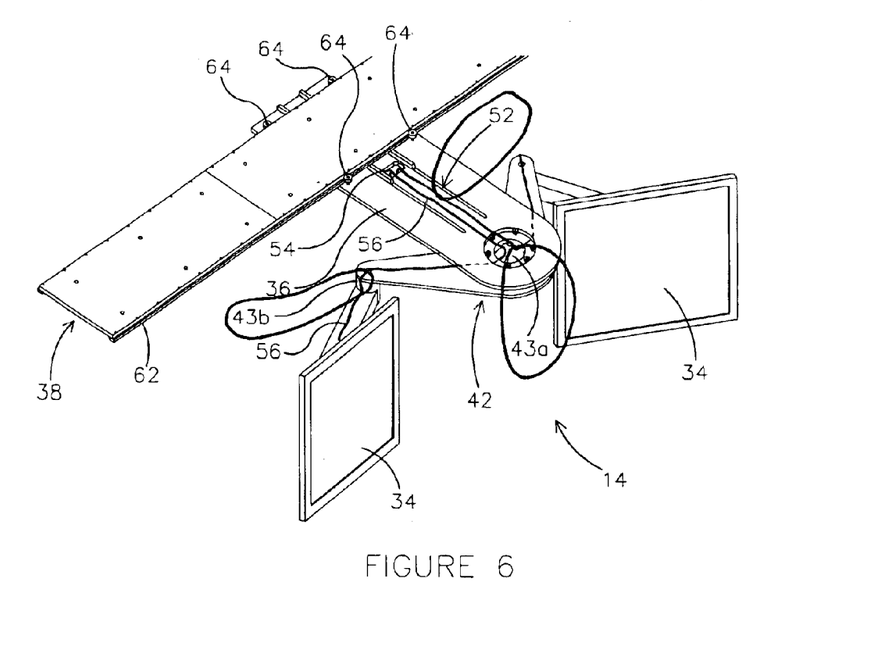
FIG. 6 is a bottom perspective view of the support system display.

Referring to FIGS. 5 and 6, movable display support system 14 is shown in a reverse view so that the underside of base 36 is visible. Base 36 includes a set of passages 52 and an aperture 54 for routing of cables 56 (for utilities such as power, communication and/or data, which may be routed to base 36 through passage or groove 41 of panel 40) to each of display panels 34. Base 36 also includes a hub 58 providing paths or slots 60 for maintaining or retaining cables 56 below the coupling of display support assembly 42. As shown in FIG. 5, track system 38 includes a set of tracks or rails 62 providing for guided and bounded motion of base 36. As shown in FIG. 6, a set of roller guides 64 on base 36 engage rails 62 of track system 38. According to a particularly preferred embodiment, hub 58 is rotatable within base 36 and display support assembly 42 is mounted to hub 58 to allow for rotation of display panels 34. Display support assembly 42 may provide a worksurface 66 as well as a handle 68 (both shown in FIG. 2) to facilitate movement of the display devices.

According to any preferred embodiment, the system will provide for a wide range of motion for one or more display devices, including one or more of the following arrangements or combinations of arrangements for positioning and repositioning: (a) translating movement of the base along the track system, e.g. from one part of the work space to another for open use or stowing (see FIGS. 3A and 3B); (b) rotation of the display support assembly within a range of motion, e.g. to allow open viewing or privacy or stowing of the display device (see FIGS. 2 and 3A and 3B); (c) articulation of the structure or arm, e.g. further to optimize the viewing angle/position (such as to remove glare or enhance visibility) of the display screen or further to enhance sharing/revealing or privacy/concealment of information. According to any preferred embodiment, the wide range of motion provided by the system will enhance the ability of workers or other persons to work collaboratively or to maintain privacy with information or to open or stow the display device (or display devices) conveniently—relatively quickly and easily—and without requiring significant concern for management of cables.

According to alternative embodiments, the movable display support system may be configured for one information display device or two or more information display devices; the information display devices may be of any type, including flat display panels or other types of video monitors (e.g. CRT) or any other type of data or information display device or appliance. The information display device may be associated with any type of appliance or device, such as a computing device or a television or network, etc.

In a conventional arrangement for associating a display device within a work space, where the display device is positioned on a fixed worksurface, constraints are typically imposed upon the orientation of a user or users relative to the entrance of the work space or adjacent aisles or opportunities for potential shared zones for viewing the display device with others. For example, if the display device is positioned on a worksurface to the back (or in one side or back corner) of the work space, the user of the work space may be constrained to work with her or his back to the entrance of the work space and information on the display device may be visible to those who enter the work space or walk along the adjacent aisle; if the display device is positioned on a worksurface near the center or front of the work space, the user of the work space may be constrained to "work around" the display device and may be less able to share information on the display device with those who enter the work space.

According to any preferred embodiment, the support system will provide enhanced functionality in comparison with such conventional arrangements, and allow the display device (or display devices) to be positioned selectively to enhance privacy or openness, or generally to facilitate the work to be performed in the work space; the support system is intended to allow the repositioning (including physical placement and orientation) of the display device to suit the needs of the worker. That is, according to any preferred embodiment of the support system, the user or users (without having to adapt or adjust their own posture and/or position) will be able to adapt the positioning and orientation of the display device or devices for various use conditions.

According to other exemplary embodiments, the display devices may be associated with other articles of furniture and/or physical structures (such as panels, partitions, or walls). It is important to note that the term "article of furniture" is intended to be a broad term and not a term of limitation. The term "article of furniture," as used in this disclosure, may include, without limitation: systems furniture (e.g., partition wall systems, architectural walls, space frames, work stations, etc.), casegoods (e.g., file cabinets, storage bins, containers, closets, etc.), seating products (e.g., chairs, stools, lounges, etc.), work surfaces (e.g., tables, desk systems, credenzas, etc.), lighting systems, and other accessories.

It is important to note that the term "information" is intended to be a broad term and not a term of limitation. The term "information" may include information of any type or form or combination. It is also important to note that the terms "worksurface" and "work space" are intended to be given broad scope and are not terms of limitation. It is also important to note that the construction and arrangement of the elements of the system as shown in the preferred and other exemplary embodiments is illustrative only.

Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, protocols, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. A movable support system adapted for providing at least one display device configured for use within a work space by at least one user comprising:
    a mounting structure;
    a track system mounted to the mounting structure and providing a track;
    a display support assembly having a first section movably coupled to the track and a second section projecting beyond the track into the work space and configured for attachment of at least one display device;
    a work surface mounted to the mounting structure above the first section of the display support assembly to provide a slot between the work surface and the mounting structure through which the second section of the display support assembly projects into the work space;
    wherein at least one display device installed on the display support assembly may be selectively positioned for use within the work space in a variety of positions by (a) movement of the display support assembly relative to the mounting structure within the slot and transverse to the work surface and (b) movement of the display device relative to the display support assembly; and
    wherein the second section of the display support assembly is cantilevered so that the display device may be used in a plurality of positions including (a) a first position where the display device faces toward the track system, (b) a second position where the display device is transverse to the track system, and (c) a third position where the display device faces away from the track system.

2. The system of claim 1 wherein the track is linear.

3. The system of claim 1 wherein the track is coupled to an article of furniture.

4. The system of claim 1 wherein the track is mounted on storage furniture.

5. The system of claim 1 wherein the display support assembly provides a plurality of arms.

6. The system of claim 1 wherein the display support assembly is configured to provide at least one passage for management of one or more cables coupled to the display device.

7. The system of claim 1 wherein the display support assembly includes a hub providing for management of one or more cables coupled to the display device.

8. The system of claim 7 wherein the management of one or more cables is provided at least partially through one or more passages.

9. The system of claim 1 wherein the display support assembly is configured for coupling of two display devices.

10. The system of claim 1 wherein the display support assembly includes a pair of flanges and a pair of arms and a display device is attachable to each of the pair of arms.

11. The system of claim 1 further comprising at least one display device coupled to the display support assembly.

12. The system of claim 1 wherein the display support assembly is cantilevered from the track.

13. The system of claim 1 wherein the display support assembly is perpendicular to the track.

14. The system of claim 1 wherein the display support assembly is non-pivotably mounted to the track.

15. The system of claim 1 configured for use in a work space providing at least one mobile table and wherein the display support assembly is at a height above the mobile table.

16. The system of claim 1 wherein the display support assembly is configured for at least two display panels.

17. An apparatus providing a movable support system adapted for providing a display device with at least two display panels configured for use within a work space by at least one user comprising:
 a mounting structure;
 a track system mounted to the mounting structure and providing at least one track;
 a display support assembly having a first section movably coupled to the track and a second section projecting beyond the track into the work space and configured for attachment to at least two display panels;
 a worksurface mounted to the mounting structure above the first section of the display support assembly to provide a gap between the work surface and the mounting structure through which the second section of the display support assembly projects into the work space;
 wherein each of the display panels is coupled to the second section of the display support assembly by an arm providing a first joint and a second joint; and
 wherein each of the display panels may be selectively positioned for use within the work space in a variety of positions by (a) movement of the display support assembly relative to the mounting structure within the gap and transverse to the work surface and (b) movement of the display panels relative to the display support assembly about the arm; and
 wherein the second section of the display support assembly is cantilevered so that each of the display panels may be used in a plurality of positions including (a) a first position where the display panels face toward the track system, (b) a second position where the display panels are transverse to the track system, and (c) a third position where the display panels face away from the track system.

18. The apparatus of claim 17 wherein the track system is a linear track.

19. The apparatus of claim 17 wherein the track is mounted to an article of furniture.

20. The apparatus of claim 17 wherein the track is mounted on storage furniture.

21. The apparatus of claim 17 wherein the work surface is mounted over the track.

22. The apparatus of claim 17 wherein the display support assembly has at least two articulable arms.

23. The apparatus of claim 17 wherein the display support is configured to provide a passage for management of wires.

24. The apparatus of claim 17 wherein the display support assembly manages wires through a hub.

25. The apparatus of claim 17 wherein the display support assembly is pivotably coupled to the display support assembly at a hub.

26. The apparatus of claim 17 wherein the display support assembly provides at least two flanges each for attachment of at least one articulable arm attachable to at least one display device.

27. The apparatus of claim 17 further comprising at least one display device coupled to the display support assembly.

28. The apparatus of claim 17 wherein the display support assembly is cantilevered from the track.

29. The apparatus of claim 17 wherein the display support assembly is perpendicular to the track.

30. The apparatus of claim 17 wherein the display support assembly is non-pivotably mounted to track.

31. The apparatus of claim 17 configured for use in a work space providing at least one mobile table and wherein the display support assembly is at a height above the mobile table.

32. The apparatus of claim 17 wherein the display support assembly is configured to provide at least one passage for management of at least one cable coupled to the display device.

33. The apparatus of claim 17 wherein the first joint comprises a pivotable joint between the display support assembly and the display device to facilitate movement of the display device about a first axis and the second joint comprises a pivotable joint between the display support assembly and the display device to facilitate movement of the display device about a second axis so that the display device is selectively repositionable relative to the support in at least one of upwardly, downwardly, laterally and pivotably.

34. The apparatus of claim 33 wherein the first axis is a vertical axis and the second axis is a horizontal axis.

35. The apparatus of claim 34 wherein the display support assembly is cantilevered away from the mounting structure in a generally horizontal orientation.

36. A movable support system adapted for providing at least one display device configured for use within a work space and configured to be coupled to utilities such as power or data through cables, comprising:
 a mounting structure;
 a track system mounted to the mounting structure and providing a track;
 a display support assembly having a first section movably coupled to the track and a second section cantilevered away from the mounting structure and projecting beyond the track into the work space and configured for attachment of the display device so that the display device may be used in a plurality of positions including (a) a first position where the display device faces toward the track system, (b) a second position where the display device is transverse to the track system, and (c) a third position where the display device faces away from the track system;
 a work surface mounted to the mounting structure above the first section of the display support assembly to provide a gap between the work surface and the mounting structure through which the second section of the display support assembly projects into the work space;
 wherein the display device installed on the display support assembly may be selectively positioned for use within the work space in a variety of positions relative to the track by (a) movement of the display support assembly relative to the mounting structure within the gap and transverse to the work surface and (b) movement of the display device relative to the display support assembly; and
 wherein the display support assembly is configured to provide at least one passage for management of cables configured to be coupled to the display device.

37. The system of claim 36 wherein the track is linear.

38. The system of claim 36 wherein the track is coupled to an article of furniture.

39. The system of claim 36 wherein the track is mounted on storage furniture.

40. The system of claim 36 wherein the display support assembly provides a plurality of arms.

41. The system of claim 36 wherein the display support assembly includes a hub providing for management of one or more cables coupled to the display device.

42. The system of claim 36 wherein the display support assembly is configured for coupling of two display devices.

43. The system of claim 36 wherein the display support assembly includes a pair of flanges and a pair of arms and a display device is attachable to each of the pair of arms.

44. The system of claim 36 further comprising at least one display device coupled to the display support assembly.

45. The system of claim 36 wherein the display support assembly is cantilevered from the track.

46. The system of claim 36 wherein the display support assembly is perpendicular to the track.

47. The system of claim 36 wherein the display support assembly is non-pivotably mounted to track.

48. The system of claim 36 configured for use in a work space providing at least one mobile table and wherein the display support assembly is at a height above the mobile table.

49. The system of claim 36 wherein the display support assembly is configured for at least two display panels.

50. The system of claim 36 wherein the management of cables is provided at least partially through passages in the display support assembly.

51. A movable support system adapted for providing at least one display device configured for use by at least one person in a work space having an entrance, comprising
a mounting structure;
a track system mounted to the mounting structure and providing a track;
a display support assembly having a first section movably coupled to the track and a second section projecting beyond the track into the work space and configured for attachment of at least one display device;
wherein a display device installed on the display support assembly may be selectively positioned for use within the work space in a variety of positions by (a) movement of the display support assembly relative to the mounting structure transverse to the work surface and (b) movement of the display device relative to the display support assembly about at least one of a first joint, a second joint and a third joint;
wherein the second section of the display support assembly is cantilevered so that the display device may be used in a plurality of positions including (a) a first position where the display device faces toward the track system, (b) a second position where the display device is transverse to the track system, and (c) a third position where the display device faces away from the track system; and
so that each person within the work space may selectively choose a body orientation or a body position relative to the entrance or otherwise within the workspace while using the display device.

52. The system of claim 51 wherein a range of motion provided by the display support assembly is such that the body orientation or body position of at least one person using the display device in the work space relative to the entrance may include (a) back to the entrance; (b) face to the entrance; or (c) profile or side to the entrance.

53. The system of claim 51 wherein a position of the person relative to the display device can be adapted from a first position where information contained on the display device is not perceptible to the person to a second position where information contained on the display device is perceptible to the person by relative movement of the display support assembly and without requiring that the person make substantial change in body orientation or body position.

54. The system of claim 51 wherein one or both of two users can adapt the position of at least one display device to improve the viewing position for perception of information on the display device by movement of the display support assembly.

55. The system of claim 51 wherein the display device can be moved using the display support assembly from a non-use position where information contained on the display device is not perceptible to the person to an in-use position where information contained on the display device is perceptible to the person.

56. The system of claim 51 wherein the display device is configured for use by a plurality of users including a first group of at least one person and a second group of at least one person and for movement between a first position and a second position so that in the first position information contained on the display device is perceptible to the first group and in the second position information contained on the display device is perceptible to the second group, the information being private or concealed to the second group of users in the first position and public or visible to the second group of users in the second position.

57. The system of claim 51 wherein the display support assembly is configured to provide at least one passage for management of a cable coupled to the display device.

58. The apparatus of claim 51 wherein the first joint comprises a pivotable joint between the second section of the display support assembly and the display device to facilitate pivotal movement of the display device about a first axis and the second joint comprises a pivotable joint between the second section of the display support assembly and the display device to facilitate pivotal movement of the display device about a second axis and the third joint comprises a pivotable joint between the second section of the display support assembly and the display device to facilitate pivotal movement of the display device about a third axis so that the display device is selectively repositionable relative to the display support assembly in at least one of upwardly, downwardly, laterally and pivotably.

59. The apparatus of claim 58 wherein the first axis is a vertical axis and the second axis is a horizontal axis and the third axis is a horizontal axis transverse to the second axis.

60. The apparatus of claim 58 wherein the display support assembly is generally parallel to the second axis and the third axis.

61. The apparatus of claim 58 wherein the display support assembly is movable in a first plane parallel to a second plane defined by the second axis and the third axis.

* * * * *

UNITED STATES PATENT AND TRADEMARK OFFICE
CERTIFICATE OF CORRECTION

PATENT NO. : 6,892,650 B2
DATED : May 17, 2005
INVENTOR(S) : Mark A. Baloga, Carl V. Forslund III and Thomas G. Feldpausch It is certified that error appears in the above-identified patent and that said Letters Patent is hereby corrected as shown below:

Drawings,
Replace drawing sheets 3 of 5 and 5 of 5 with the attached drawing sheets, as shown on the attached pages.

Column 1,
Line 9, after "filed Jun. 22, 2001" add -- now U.S. Pat. No. 6,739,096, and".
Line 11, after "No. 6,374,547" delete ", now U.S. Pat. No. 6,375,547".

Signed and Sealed this

Twenty-fifth Day of October, 2005

JON W. DUDAS
*Director of the United States Patent and Trademark Office*